(12) United States Patent
Hosonuma et al.

(10) Patent No.: US 10,428,948 B2
(45) Date of Patent: Oct. 1, 2019

(54) SEAL RING

(71) Applicant: NOK CORPORATION, Tokyo (JP)

(72) Inventors: Norimasa Hosonuma, Fujisawa (JP); Nozomu Suzuki, Fujisawa (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 15/558,228

(22) PCT Filed: Mar. 11, 2016

(86) PCT No.: PCT/JP2016/057706
§ 371 (c)(1),
(2) Date: Sep. 14, 2017

(87) PCT Pub. No.: WO2016/148043
PCT Pub. Date: Sep. 22, 2016

(65) Prior Publication Data
US 2018/0045314 A1    Feb. 15, 2018

(30) Foreign Application Priority Data
Mar. 16, 2015  (JP) .................... 2015-052459

(51) Int. Cl.
*F16J 15/16* (2006.01)
*F16J 15/3272* (2016.01)
(Continued)

(52) U.S. Cl.
CPC .......... *F16J 15/164* (2013.01); *F16J 15/3272* (2013.01); *F16J 15/3464* (2013.01); *F16J 15/441* (2013.01)

(58) Field of Classification Search
CPC ........ F16J 15/18; F16J 15/441; F16J 15/3244; F16J 15/164
See application file for complete search history.

(56) References Cited

U.S. PATENT DOCUMENTS 5,066,026 A * 11/1991 Heck ............... F16J 15/3412
                                                277/400
5,385,409 A *  1/1995 Ide ................. F16J 15/3432
                                                277/400
5,558,341 A *  9/1996 McNickle ......... F16J 15/3488
                                                277/400

(Continued)

FOREIGN PATENT DOCUMENTS

CA       2668482 A1    5/2008
CN     102483162 A     5/2012
(Continued)

OTHER PUBLICATIONS

Chinese Office Action dated Aug. 27, 2018 (corresponding to CN 201680014303.6).
(Continued)

*Primary Examiner* — Kristina R Fulton
*Assistant Examiner* — L. Susmitha Koneru
(74) *Attorney, Agent, or Firm* — Harness, Dickey & Pierce, P.L.C.

(57) ABSTRACT

A seal ring (100) is attached to an annular groove (210) provided on an outer periphery of a shaft (200), and slides on a lateral wall surface (211) of the annular groove (210) on a lower pressure side. The seal ring (100) includes: a dynamic pressure generation groove (120) that generates dynamic pressure with sealed fluid introduced thereinto, the dynamic pressure generation groove (120) being provided in a sliding region X of a lateral surface (111) thereof on the lower pressure side in which the lateral surface (111) slides on the lateral wall surface (211); and an introduction hole (130) that has an opening (131) at a position away from the lateral surface (111) of an inner peripheral surface (112) of the seal ring (100) by a distance Y, communicates with the dynamic pressure generation groove (120), and introduces the sealed fluid into the dynamic pressure generation groove (120).

1 Claim, 4 Drawing Sheets

(51) Int. Cl.
  *F16J 15/44*   (2006.01)
  *F16J 15/34*   (2006.01)

(56) References Cited

U.S. PATENT DOCUMENTS

| | | | |
|---|---|---|---|
| 6,290,235 B1 * | 9/2001 | Albertson | F16J 15/002 |
| | | | 277/510 |
| 6,446,976 B1 * | 9/2002 | Key | F16J 15/3416 |
| | | | 277/367 |
| 8,074,995 B2 * | 12/2011 | Vasagar | F16J 15/3244 |
| | | | 277/301 |
| 9,695,940 B2 * | 7/2017 | Haynes | F16J 15/442 |
| 9,927,033 B2 * | 3/2018 | Baheti | F16J 15/3448 |
| 2012/0018957 A1 | 1/2012 | Watanabe | |
| 2016/0186862 A1 | 6/2016 | Kondou et al. | |

FOREIGN PATENT DOCUMENTS

| | | | |
|---|---|---|---|
| DE | 19713455 A1 * | 10/1998 | ............ F16J 15/441 |
| EP | 2084395 A1 | 8/2009 | |
| JP | H06-050438 A | 2/1994 | |
| JP | H08121603 A | 5/1996 | |
| JP | H08-159290 A | 6/1996 | |
| JP | 2002276815 A | 9/2002 | |
| JP | 2015028382 A | 2/2015 | |
| WO | 2011105513 A1 | 9/2011 | |

OTHER PUBLICATIONS

Extended European Search Report dated Oct. 5, 2018 (corresponding to EP 16764873.2).

* cited by examiner

SEAL RING

CROSS-REFERENCE TO RELATED APPLICATIONS

This application is a National Stage of International Application No. PCT/JP2016/057706, filed Mar. 11, 2016 (now WO 2018/0045314A1), which claims priority to Japanese Application No. 2015-052459, filed Mar. 16, 2015. The entire disclosures of each of the above applications are incorporated herein by reference.

FIELD

The present disclosure relates to a seal ring that seals the annular gap between a shaft and a housing rotating relative to each other.

BACKGROUND

Conventionally, a seal ring that seals the annular gap between a shaft and a housing rotating relative to each other has been used in an Automatic Transmission (AT) or a Continuously Variable Transmission (CVT) for an automobile to maintain hydraulic pressure. In order to improve the fuel efficiency of an automobile or reduce the wear-out of a seal ring, it is preferable that the rotational torque of the seal ring be low. In view of this, there has been conventionally known technology for providing a groove into which sealed fluid is introduced, on the lateral surface of a seal ring that serves as a sliding surface at the time of its relative sliding (see PTL 1). In a seal ring disclosed in PTL 1, a flow path (groove) into which sealed fluid is introduced from the side of the inner periphery of the seal ring is formed over a circumference on the side of the inner periphery of the sliding surface (lateral surface) of the seal ring. When the sealed fluid is introduced into the flow path, the surface pressure of the sliding surface reduces with the generation of dynamic pressure. Therefore, the rotational torque (frictional torque) of the seal ring is reduced.

CITATION LIST

Patent Literature

[PTL 1] Japanese Patent Application Laid-open No. H08-121603

SUMMARY

Technical Problem

The seal ring disclosed in PTL 1 prevents the wear-out of the sliding surface with the reduction in the rotational torque. However, if the seal ring is continuously used, the wear-out could gradually advance. Since depth from the sliding surface of the flow path provided on the sliding surface reduces (the flow path is made shallower) as the sliding surface wears out, the flow path area on the side of the inner periphery of the flow path also reduces. Since the flow amount of the sealed fluid introduced into the flow path also reduces as the flow path area on the side of the inner periphery reduces, the dynamic pressure effect of the flow path could reduce. That is, in the seal ring disclosed in PTL 1, the rotational torque is likely to increase with the reduction in the dynamic pressure effect as the sliding surface wears out as the sliding surface is used.

In view of the above problem, it is an object of the present disclosure to provide a seal ring capable of preventing an increase in a rotational torque even if a sliding surface wears out as the sliding surface is used.

Solution to Problem

The present disclosure employs the following solution to solve the above problem.

That is, the present disclosure provides a seal ring that seals an annular gap between a shaft and a housing rotating relative to each other to maintain pressure of sealed fluid in a region on a higher pressure side, the seal ring being attached to an annular groove provided on an outer periphery of the shaft, and sliding on a lateral wall surface of the annular groove on a lower pressure side, the seal ring including: a dynamic pressure generation groove that generates dynamic pressure with the sealed fluid introduced thereinto, the dynamic pressure generation groove being provided in a region of a lateral surface thereof on the lower pressure side in which the lateral surface slides on the lateral wall surface; and an introduction hole that has an opening at a position away from the lateral surface of an inner peripheral surface of the seal ring, communicates with the dynamic pressure generation groove, and introduces the sealed fluid into the dynamic pressure generation groove.

Here, in the present disclosure, the "higher pressure side" indicates a side where pressure becomes higher when differential pressure is generated between both sides of the seal ring, whereas the "lower pressure side" indicates a side where pressure becomes lower when differential pressure is generated between both sides of the seal ring. According to the present disclosure, sealed fluid is introduced from the introduction hole having the opening on the inner peripheral surface of the seal ring into the dynamic pressure generation groove provided on the lateral surface on the lower pressure side. Therefore, the surface pressure of the lateral surface (sliding surface) sliding on the lateral wall surface of the annular groove is reduced. Thus, the rotational torque of the seal ring is effectively reduced. Here, even if the rotational torque is reduced, the lateral surface of the seal ring could gradually wear out as the lateral surface is used. However, according to the present disclosure, the opening of the introduction hole is provided at the position away from the lateral surface on the lower pressure side of the inner peripheral surface of the seal ring. Therefore, even if the position of the lateral surface is gradually shifted to the higher pressure side (the seal ring is made gradually shallower) due to the wear-out, the area of the opening of the introduction hole does not reduce. Accordingly, according to the present disclosure, even if the sliding surface wears out as the sliding surface is used, the flow amount of the sealed fluid introduced from the introduction hole into the dynamic pressure generation hole does not reduce. Therefore, the increase in the rotational torque due to the wear-out of the seal ring can be prevented.

The dynamic pressure generation groove may be formed to be shallower on both end sides thereof than on a center thereof in a circumferential direction, and the introduction hole may communicate with the center of the dynamic pressure generation groove.

By forming the dynamic pressure generation groove into such a shape, it becomes possible to effectively generate dynamic pressure with a so-called wedge effect. In addition, it becomes possible to generate dynamic pressure regardless of the rotating direction of the seal ring relative to the annular groove.

Advantageous Effects of the Disclosure

As described above, a seal ring according to the present disclosure can prevent an increase in a rotational torque even if a sliding surface wears out as the sliding surface is used.

DRAWINGS

DETAILED DESCRIPTION

Hereinafter, with reference to the drawings, a mode for carrying out the present disclosure will be illustratively described in detail based on an example. However, dimensions, materials, shapes, their relative arrangements, or the like of constituents described in the example do not intend to limit the scope of the present disclosure unless otherwise specifically described. Note that a seal ring according to the present example is used to seal the annular gap between a shaft and a housing that rotate relative to each other to maintain hydraulic pressure in a transmission such as an AT or a CVT for an automobile. In addition, in the following description, a "higher pressure side" indicates a side where pressure becomes higher when differential pressure is generated between both sides of the seal ring, whereas a "lower pressure side" indicates a side where pressure becomes lower when differential pressure is generated between both sides of the seal ring.

EXAMPLE

Figure 1:
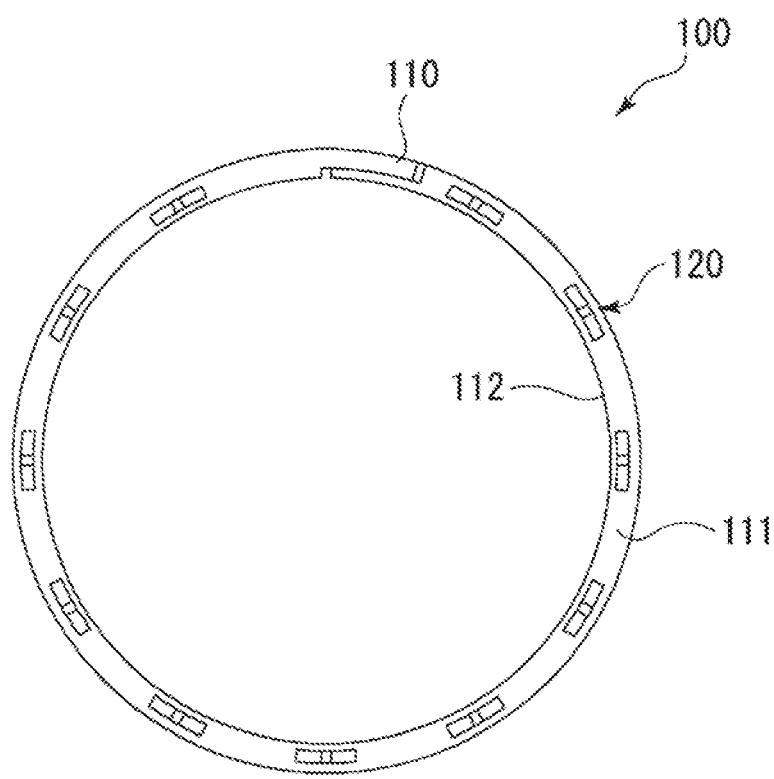
FIG. 1 is a side view of a seal ring according to an example of the present disclosure.
Figure 2:
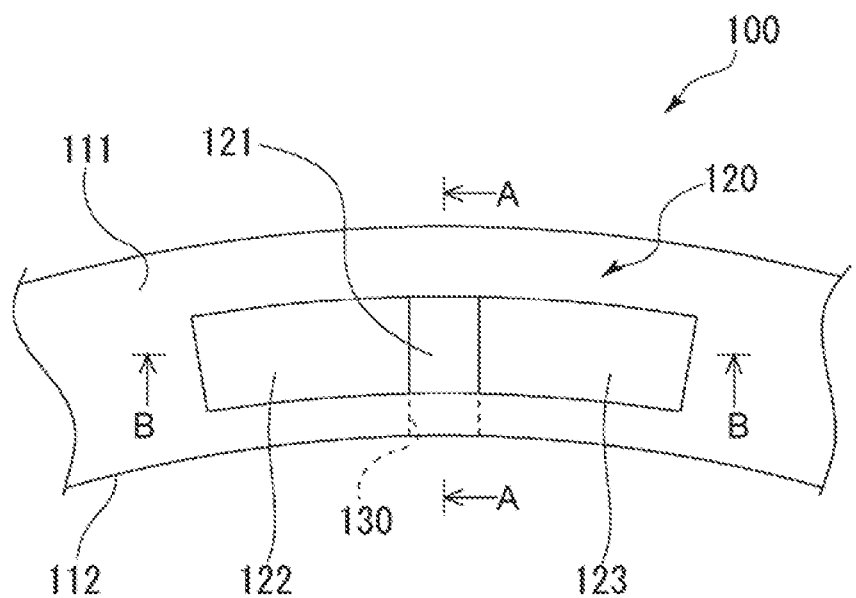
FIG. 2 is a partially enlarged view of the lateral surface of the seal ring according to the example of the present disclosure.
Figure 3:
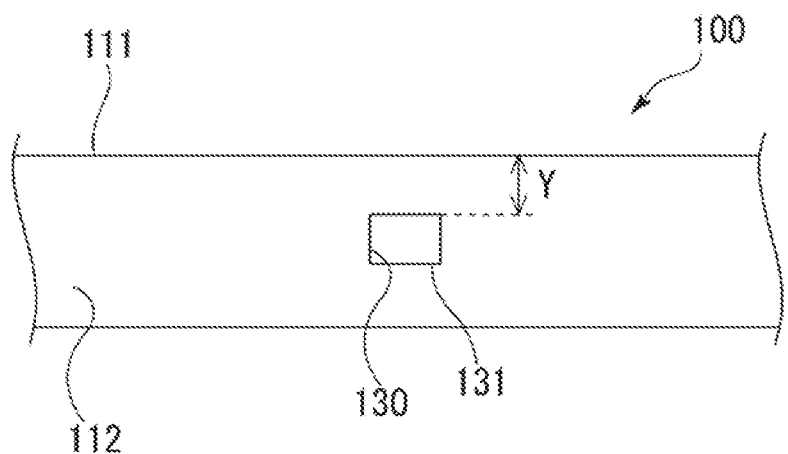
FIG. 3 is a partially enlarged view of the inner peripheral surface of the seal ring according to the example of the present disclosure.
Figure 4:
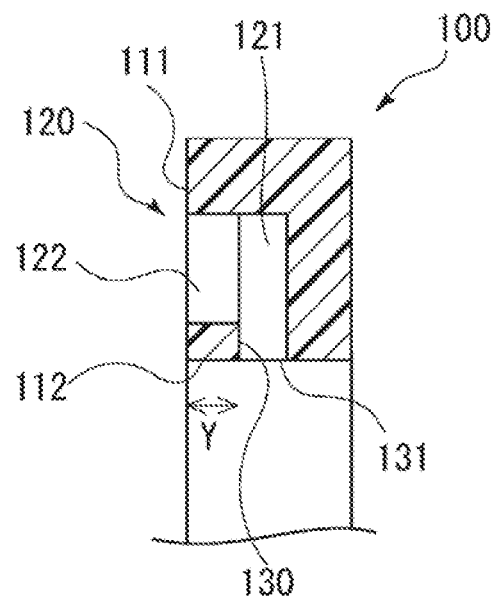
FIG. 4 is a schematic cross-sectional view of the seal ring according to the example of the present disclosure.
Figure 5:
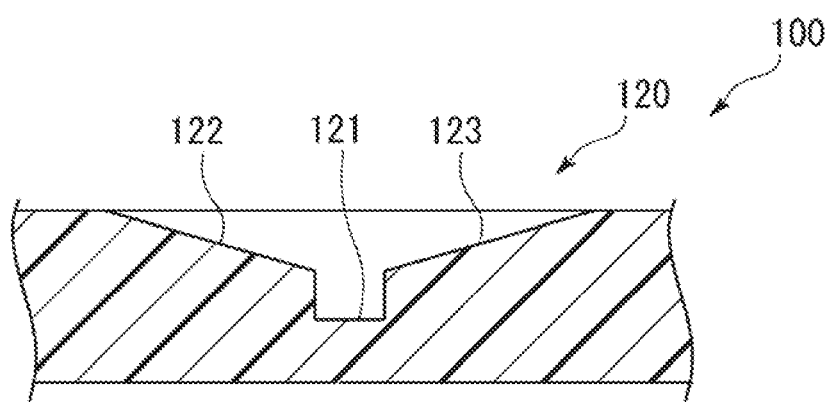
FIG. 5 is a schematic cross-sectional view of the seal ring according to the example of the present disclosure.
Figure 6:
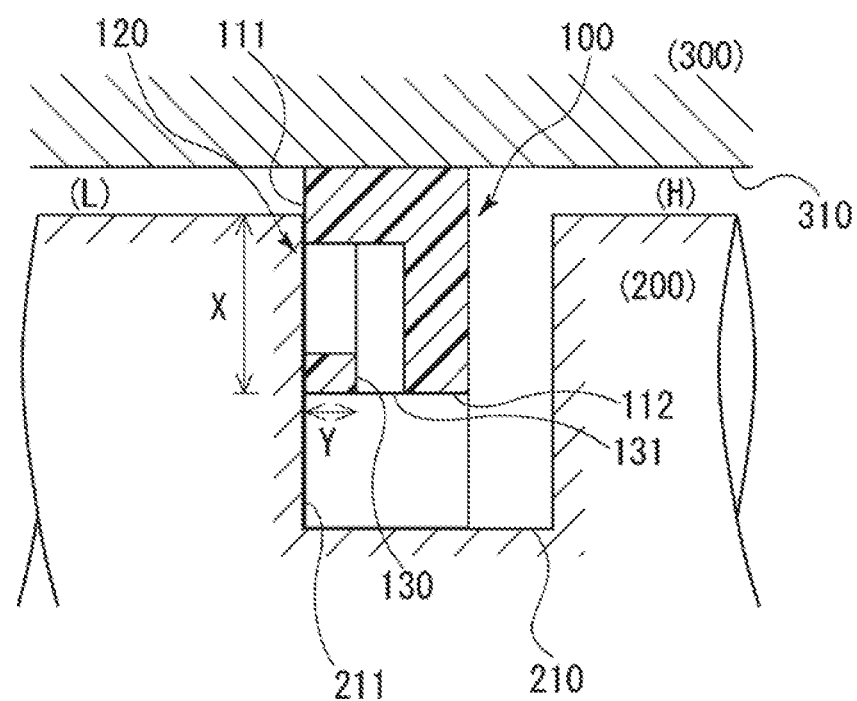
FIG. 6 is a schematic cross-sectional view showing a state in which the seal ring according to the example of the present disclosure is in use.

The seal ring according to the example of the present disclosure will be described with reference to FIGS. 1 to 6. FIG. 1 is a side view of the seal ring according to the example of the present disclosure. Note that FIG. 1 shows one (sliding surface) of two lateral surfaces of the seal ring that slides on the lateral wall surface of the annular groove of a shaft. FIG. 2 is a partially enlarged view of the lateral surface of the seal ring according to the example of the present disclosure. FIG. 3 is a partially enlarged view of the inner peripheral surface of the seal ring according to the example of the present disclosure. FIG. 4 is a schematic cross-sectional view of the seal ring according to the example of the present disclosure. FIG. 4 is a cross-sectional view taken along line A-A in FIG. 2. FIG. 5 is a schematic cross-sectional view of the seal ring according to the example of the present disclosure. Note that FIG. 5 is a cross-sectional view taken along line B-B in FIG. 2. Further, FIG. 6 is a schematic cross-sectional view showing a state in which the seal ring according to the example of the present disclosure is in use. Note that the cross section of the seal ring in FIG. 6 is a cross section taken along line A-A in FIG. 2.

<Configuration of Seal Ring>

A seal ring 100 according to the present example is attached to an annular groove 210 provided on the outer periphery of a shaft 200 and seals the annular gap between the shaft 200 and a housing 300 that rotate relative to each other (see FIG. 6). Thus, the seal ring 100 maintains fluid pressure in a sealed region indicating a one-side region separated by the seal ring 100. Note that in the present example, fluid (sealed fluid) in the sealed region is lubricant for a transmission. The present example is so configured that fluid pressure in a right-side region becomes higher than fluid pressure in a left-side region in FIG. 6 when fluid pressure (hydraulic pressure) is being generated (for example, when the engine of an automobile is being operated). That is, the seal ring 100 plays a role in maintaining the fluid pressure in the sealed region on the right side of the figure. Hereinafter, in FIG. 6, a right side and a left side will be indicated as a higher pressure side H and a lower pressure side L, respectively.

The seal ring 100 is made of a resin material such as polyether ether ketone (PEEK), polyphenylenesulfide (PPS), and polytetrafluoroethylene (PTFE). In addition, the outer peripheral surface of the seal ring 100 is configured to have a peripheral length shorter than the peripheral length of an inner peripheral surface 310 of the shaft hole of the housing 300 and configured not to have interference. Accordingly, in a state in which the fluid pressure does not act, the outer peripheral surface of the seal ring 100 could be separated from the inner peripheral surface 310 of the housing 300.

The seal ring 100 has an abutment joint part 110 at one portion in its circumferential direction. The abutment joint part 110 employs a so-called special step cut with which the abutment joint part 110 is cut off in a staircase pattern when seen from the side of the outer peripheral surface and the sides of both lateral surfaces. The special step cut is a known art, and thus its detailed description will be omitted. However, the special step cut has the property of maintaining stable sealing performance even if the circumferential length of the seal ring 100 changes due to its thermal expansion/contraction. Note that the shape of the abutment joint part 110 is not limited to this but can also employ a straight cut, a bias cut, a step cut, or the like. Note that when a material (such as PTFE) having low elasticity is employed as the material of the seal ring 100, the seal ring 100 may be endless without having the abutment joint part 110. In addition, the abutment joint part 110 may be molded by a mold or may be molded by cutting or the like.

The seal ring 100 has dynamic pressure generation grooves 120 on its lateral surface 111 on the side of the sliding surface. The plurality of dynamic pressure generation grooves 120 (11 dynamic pressure generation grooves 120 in the present example) is provided at even intervals over a circumference excluding the vicinity of the abutment joint part 110 on the lateral surface 111 of the seal ring 100. The plurality of dynamic pressure generation grooves 120 is provided in a region (sliding region X in FIG. 6) of the lateral surface 111 of the seal ring 100 in which the lateral surface 111 slides on a lateral wall surface 211 of the annular groove 210 on the lower pressure side, and generates dynamic pressure when the sealed fluid is introduced into the dynamic pressure generation grooves 120. Note that the dynamic pressure generation grooves 120 can be molded by, for example, cutting, but its molding method is not particularly limited.

The dynamic pressure generation grooves 120 are configured by a central part 121 provided at a center in the circumferential direction of the seal ring 100 and by a pair of tapered parts 122 and 123 extending in the circumferential direction from the central part 121. The central part 121 has a flat bottom surface. On the other hand, the tapered parts 122 and 123 are formed to be gradually shallower from the central part 121 to their terminal end. Note that the bottom surface of the central part 121 is formed to be much deeper than those of the tapered parts 122 and 123.

The seal ring 100 has introduction holes 130, each of which has an opening 131 at a position away from the lateral surface 111 of an inner peripheral surface 112, communicates with the dynamic pressure generation groove 120, and introduces the lubricant into the dynamic pressure generation groove 120. The introduction hole 130 is provided for each of the plurality of dynamic pressure generation grooves 120 and communicates with the central part 121 of the dynamic pressure generation groove 120. Here, the opening 131 of the introduction hole 130 is provided at a position away from the lateral surface 111 of the seal ring 100 by a distance Y. Note that the introduction hole 130 can be molded by a drill or the like but its molding method is not particularly limited.

Note that although not shown in the figures, a lateral surface on the opposite side of the lateral surface 111 of the seal ring 100 is entirely flat.

<Mechanism Where Seal Ring is in Use>

A mechanism where the seal ring 100 according to the present example is in use will be described with particular reference to FIG. 6. FIG. 6 shows a state in which differential pressure is generated between the two regions separated by the seal ring 100 (a state in which pressure in the right-side region becomes higher than pressure in the left-side region in the figure) with the start of an engine. In the state in which the differential pressure is generated as described above, the lateral surface 111 of the seal ring 100 is slidably brought into intimate contact with the lateral wall surface 211 on the lower pressure side L of the annular groove 210 by the fluid pressure acting on the lateral surface on the higher pressure side H. At the same time, the outer peripheral surface of the seal ring 100 is slidably brought into intimate contact with the inner peripheral surface 310 of the shaft hole of the housing 300 by the fluid pressure acting on the inner peripheral surface 112 of the seal ring 100.

In the way described above, it becomes possible to seal the annular gap between the shaft 200 and the housing 300 that rotate relative to each other to maintain the hydraulic pressure in the region (sealed region) on the higher pressure side H. Further, when the shaft 200 and the housing 300 rotate relative to each other, the lateral surface 111 of the seal ring 100 slides on the lateral wall surface 211 of the annular groove 210. Here, the lubricant is introduced from the introduction holes 130 into the dynamic pressure generation grooves 120 provided on the lateral surface 111 of the seal ring 100. As shown in FIG. 6, since the dynamic pressure generation grooves 120 are provided in the sliding region X of the lateral surface 111 in which the lateral surface 111 slides on the lateral wall surface 211 of the annular groove 210, the introduced lubricant flows out between the respective sliding parts of the lateral surface 111 and the lateral wall surface 211. Thus, when the lubricant flows out as described above, dynamic pressure is generated between the lateral surface 111 and the lateral wall surface 211, i.e., between the sliding surfaces of the seal ring 100 and the annular groove 210. Note that when the seal ring 100 rotates clockwise in FIG. 2 relative to the annular groove 210, the lubricant flows out from the terminal ends of the tapered parts 122 to the sliding parts. On the other hand, when the seal ring 100 rotates counterclockwise in FIG. 2 relative to the annular groove 210, the lubricant flows out from the terminal ends of the tapered parts 123 to the sliding parts.

<Excellent Point of Seal Ring According to Present Example>

In the seal ring 100 according to the present example, lubricant serving as sealed fluid is introduced from the introduction holes 130 into the dynamic pressure generation grooves 120. Therefore, in regions in which the dynamic pressure generation grooves 120 are provided, fluid pressure acting on the seal ring 100 from the higher pressure side H and fluid pressure acting on the seal ring 100 from the lower pressure side L cancel each other. In addition, the lubricant flows out from the tapered parts 122 and 123 when the seal ring 100 and the annular groove 210 rotate relative to each other. Therefore, dynamic pressure is generated between the sliding parts between the seal ring 100 and the annular groove 210. Since the surface pressure of the lateral surface 111 on the lateral wall surface 211 is thus reduced, it becomes possible to effectively reduce the rotational torque (sliding torque) of the seal ring 100.

Note that the dynamic pressure generation grooves 120 have the tapered parts 122 and 123 extending from the central part 121 to one and the other sides in the circumferential direction. Accordingly, the seal ring 100 can generate the above dynamic pressure regardless of the rotating direction of the seal ring 100 relative to the annular groove 210. In addition, each of the tapered parts 122 and 123 is formed to be gradually shallower toward the terminal end. Accordingly, the above dynamic pressure can be effectively generated by a so-called wedge effect.

Here, even if the rotational torque is reduced, the lateral surface 111 of the seal ring 100 could gradually wear out as the lateral surface 111 is used. However, in the seal ring 100, the openings 131 of the introduction holes 130 are provided at positions away from the lateral surface 111 by the distance Y. Therefore, even if the position of the lateral surface 111 is gradually shifted to the higher pressure side H (even if the seal ring 100 is gradually made thinner) due to the wear-out, the area of the openings 131 does not reduce. That is, even if the lateral surface 111 wears out, a flow path area for introducing the lubricant from the side of the inner periphery of the seal ring 100 to the dynamic pressure generation grooves 120 does not reduce. Therefore, in the seal ring 100, the flow amount of the lubricant introduced from the introduction holes 130 into the dynamic pressure generation grooves 120 does not reduce even if the lateral surface 111 wears out. Therefore, a reduction in dynamic pressure effect is prevented. Accordingly, an increase in the rotational torque due to the wear-out can be prevented in the seal ring 100.

Note that the numbers and the shapes of the dynamic pressure generation grooves 120 and the introduction holes 130 are not limited to those described above. Particularly, the number and the shape of the dynamic pressure generation grooves 120 may be appropriately changed to obtain a desired dynamic pressure effect. In addition, the installation positions and the shapes of the introduction holes 130 and the openings 131 may be appropriately changed to obtain a desired dynamic pressure effect or depending on to what extent the lateral surface 111 is assumed to wear out.

REFERENCE SIGNS LIST

100 Seal ring
110 Abutment joint part
111 Lateral surface
120 Dynamic pressure generation groove
130 Introduction hole
200 Shaft
210 Annular groove
211 Lateral wall surface
300 Housing

The invention claimed is:

1. A sealing system, comprising:
a seal ring that seals an annular gap between a shaft and a housing rotating relative to each other to maintain pressure of sealed fluid in a region on a higher pressure side,
the seal ring being attached to an annular groove provided on an outer periphery of the shaft, and sliding on a lateral wall surface of the annular groove on a lower pressure side,
the seal ring comprising:
a dynamic pressure generation groove that generates dynamic pressure with the sealed fluid introduced thereinto, the dynamic pressure generation groove being provided in a region of a lateral surface thereof on the lower pressure side in which the lateral surface slides on the lateral wall surface, wherein the dynamic pressure generation groove is located in the lateral surface spaced from an inner peripheral surface of the seal ring and without any secondary recess disposed in the lateral surface between the dynamic pressure generation groove and the inner peripheral surface, the dynamic pressure generation groove having a central part that defines a deepest portion of the dynamic pressure generation groove and includes a pair of shallower tapered parts on each side of the central part in a circumferential direction; and
an introduction hole that has an opening at a position spaced away from the lateral surface of the inner peripheral surface of the seal ring, communicates directly radially outward with the central part of the dynamic pressure generation groove, and introduces the sealed fluid into the dynamic pressure generation groove.

* * * * *